United States Patent [19]
Nakamura et al.

[11] Patent Number: 5,850,342
[45] Date of Patent: Dec. 15, 1998

[54] MACHINE TOOL CONTROL SYSTEM

[76] Inventors: Kaoru Nakamura, 2-18-13, Takamori, Isehara-shi, Kanagawa 259-11; Hitoshi Nakajima, 450-2, Nakano, Ebina-shi, Kanagawa 243-04; Junichi Yoshinaga, 6-4M, Higashimaruse, Ishehara-shi, Kanagawa 259-11, all of Japan

[21] Appl. No.: 719,064

[22] Filed: Sep. 24, 1996

[51] Int. Cl.[6] .............................. G06F 19/00; B26D 7/06; B65H 5/08; B65B 47/00; G01M 19/00; B25J 9/16

[52] U.S. Cl. ...................... 364/468.21; 364/900; 83/23; 83/71; 83/76.8; 83/78; 271/11; 198/468.2; 73/865.8; 317/123; 318/568.1; 101/132.5

[58] Field of Search .............................. 271/11; 364/900, 364/468.21; 83/23, 71, 76.8; 198/468.2; 73/865.8; 317/123; 318/568.1; 101/132.5

[56] References Cited

U.S. PATENT DOCUMENTS

| | | | |
|---|---|---|---|
| 3,886,413 | 5/1975 | Dow et al. | 317/123 |
| 4,209,847 | 6/1980 | Noda et al. | 364/900 |
| 4,690,021 | 9/1987 | Clark | 83/71 |
| 4,691,817 | 9/1987 | Haar | 198/468.2 |
| 4,703,925 | 11/1987 | Jelinek et al. | 271/11 |
| 4,709,605 | 12/1987 | Clark | 83/23 |
| 4,896,086 | 1/1990 | Miyahara et al. | 318/568.1 |
| 5,209,131 | 5/1993 | Baxter | 73/865.8 |

*Primary Examiner*—Reba I. Elmore
*Assistant Examiner*—Carolyn T. Baumgardner
*Attorney, Agent, or Firm*—Greenblum & Bernstein, P.L.C.

[57] ABSTRACT

A machine tool control system is provided that is capable of detecting a one-sheet takeout failure. The system includes a workpiece takeout schedule which indicates the plate thickness and number of sheets to be taken out from a stack of workpieces for each product. A one-sheet takeout sensor is also provided to detect when a one-sheet takeout device fails to takeout or suck one-sheet from the pallet of workpieces. In addition, the system includes a restoration setting key which permits an operator to select one of a plurality of modes to continue control operation of a machine tool with a controller when a one-sheet takeout failure is detected. When information from the one-sheet takeout sensor indicates a one-sheet takeout failure, based on the set mode of the restoration setting key, the controller changes the measuring range, the accumulating place for the sucked workpiece, or skips the workpiece takeout schedule based on a detected plate thickness.

11 Claims, 9 Drawing Sheets

TAKEOUT SCHEDULE ha

| No. | MACHINING PROGRAM | NUMBER OF SHEETS | PLATE THICKNESS | |
|-----|-------------------|------------------|-----------------|---|
| 10  | P1                | 5                | 1t              |   |
| 20  | P2                | 1                | 0.8t            |   |
| 30  | P3                | 2                | 1.2t            |   |
| 40  | P4                | 1                | 1.6t            |   |
| 50  |                   |                  |                 |   |
|     |                   |                  |                 |   |

FIG.5

| No. | MACHINING PROGRAM | NUMBER OF SHEETS | RAW MATERIAL PALLET | PLATE THICKNESS |
|---|---|---|---|---|
| 10 | P1 | 5 |  | 1.0t |
| 20 | P2 | 1 | PALLET A | 0.8t |
| 30 | P3 | 2 | PALLET A | 1.2t |
| 40 | P4 | 1 | PALLET A | 1.6t |
| 50 | P5 | 1 | PALLET B | 1.6t |
|  |  |  |  |  |

MACHINE TOOL CONTROL SYSTEM

BACKGROUND OF THE INVENTION

1. Field of the Invention

The present invention relates to a machine tool control system and, more particularly, to a machine tool control system having one-sheet takeout equipment for conveying workpieces placed on a pallet one by one.

2. Background Information

Recently, in a machining field, in which various machine tools are controlled, the application of Flexible Manufacturing Systems (FMS) has progressed toward the multiproduction of parts in small volume.

Generally, FMS relates to systems in which a plurality of equipment controllers are connected to a single main controller, which prepares a schedule program and operates various equipment under the schedule. An example of such an FMS system will be explained in regards to a machine tool control system.

FIG. 1 is a schematic composition view of a conventional machine tool line control system. The machine tool control system of FIG. 1 is a system in which both a tool center 1 and a field terminal 4 (hereinafter called the controller), which transfers a machining program to a CNC device 3 for controlling a machine tool 2 comprising an NC turret punch press, a bending press and the like, are connected to a communications network 5 such as a Local Area Network (LAN) or Ethernet.

Connected to the machine tool 2 is a peripheral equipment section 7 comprising, for example, a material warehouse equipment, a product warehouse equipment and the like. Each equipment of the peripheral equipment section 7 is operated according to a sequence of a line control panel 8. In this description, the peripheral equipment section 7, the machine tool 2 and the CNC 3 are generally called the FMS line.

In the peripheral equipment section 7, a one-sheet takeout equipment 9 is mounted on an accumulating equipment frame 11. The one-sheet takeout equipment 9 is moved through the rack of a guide rail 13 onto a pallet 15. A vacuum pad 19 is allowed to move up and down by a cylinder 17 so as to suck a workpiece 21.

At this point, a one-sheet takeout sensor 23 is moved to the workpiece 21 having been sucked by the vacuum pad 19 to measure the plate thickness of the workpiece 21 according to a measuring range obtained by the controller 4. When the plate thickness can be measured according to the measuring range, a one-sheet takeout success signal is sent through the line control panel 8 to the CNC device 3. When the plate thickness cannot be measured according to the measuring range, a one-sheet takeout failure signal is sent through the line control panel 8 to the CNC device 3.

Further, the tool center 1 includes both a schedule file 25 for storing a machining schedule comprising, for example, a date, a kind of machining, a material, the number of workpieces, a machining place and the like, and a machining program file 27 for storing a plurality of machining programs for executing a program according to the kind of machining.

The controller 4 communicates with the tool center 1 to read a machining schedule Hi for present or current jobs, stores the machining schedule Hi in a schedule file 30 provided in its interior and, at the same time, retrieves from the machining program file 27 a machining program Mi handling properly the machining schedule Hi of the schedule file 30 and stores it in a machining program file 32 provided in its interior.

The controller 4 draws, from the schedule file 30, a machining schedule Hi (i: a, b, c, . . . ) allocated for each machine tool facility.

The machining schedule Hi comprises, for example, a schedule (hereinafter called the takeout schedule) on which the one-sheet takeout equipment 9 takes out a workpiece on the pallet 15, a schedule of a pallet conveying machine (not shown), and the like.

When the schedule thus drawn is the takeout schedule, the controller 4, with a plate thickness included in the schedule taken as a reference value, determines a measuring range of the one-sheet takeout sensor 23 from the reference value and outputs it through the line control panel 8 to the one-sheet takeout sensor 23.

The controller 4 sends continuously a one-sheet takeout directing signal to the one-sheet takeout equipment 9 until the number of sheets on the takeout schedule is reached. Further, it sends a machining program Mi corresponding to the schedule Hi to the CNC device 3 by means of, for example, DNC transfer or memory transfer.

The conventional machine tool control system composed as described above will be explained hereinafter.

For example, when the controller 4 draws a No. 10 takeout schedule from the schedule file 30 as shown in FIG. 2, the controller 4 determines a measuring range of the one-sheet takeout sensor 23 with a set plate thickness "1 t" taken as a reference value, wherein "t" represents a unit of measure for the plate thickness value such as, for example, 1 mm.

Then, as shown in FIG. 3, the controller 4 sends the measuring range thus determined and the one-sheet takeout directing signal to the line control panel 8. In this embodiment, the controller 4 sends continuously the measuring range and the one-sheet takeout directing signal to the line control panel 8 until the number of sheets "5" is reached. The line control panel 8 sends the measuring range to the one-sheet takeout sensor 23 and sends the one-sheet takeout directing signal to the one-sheet takeout equipment 9. Each time the one-sheet takeout signal is inputted, the one-sheet takeout equipment 9 moves up and down the vacuum pad 19 to suck the workpiece 21 on the pallet 15 as shown in FIG. 3.

At this point, the one-sheet takeout sensor 23 measures the plate thickness of the workpiece 21 according to the measuring range determined by the line control panel 8. When the one-sheet takeout sensor 23 cannot measure the workpiece according to the measuring range sent (for example, when two pieces are sucked, or when a different workpiece is sucked), the one-sheet takeout sensor 23 sends a one-sheet takeout failure signal through the line control panel 8 to the controller 4.

Heretofore, the controller 4 has stopped the FMS line immediately after having inputted the one-sheet takeout failure signal from line control panel 8.

Hence, a problem has existed in that the FMS line side continues to stop until a worker cancels the stoppage of the FMS line at the controller side, so that the machining time in line operation becomes wasteful.

Also, another problem has existed in that the stoppage of the FMS line must be cancelled by a worker by replacing the workpiece on the pallet with a desired one, and then by operating the controller to restart, so that it takes a significant time to restore.

SUMMARY OF THE INVENTION

The present invention is made to solve the above problems, and it is an object of the invention to provide a machine tool control system capable of automatically continuing machining, accumulating and transporting even if a one-sheet takeout conveying equipment fails to take out one piece.

In order to achieve the above object, there is provided a machine tool control system in which the plate thickness and number of sheets taken out of workpieces for each product is predetermined as a workpiece takeout schedule. Based on the takeout schedule, a workpiece on a pallet of a peripheral equipment section is sucked by a one-sheet takeout equipment. The plate thickness of the workpiece is then measured by a one-sheet takeout sensor according to a required measuring range and the control of a machine tool is performed. The system according to the present invention may comprise: a restoration setting key which can set a plurality of kinds of modes to continue the control operation of the machine tool when information from the one-sheet takeout sensor indicates a one-sheet takeout failure; and a controller which performs a processing based on a set mode of the restoration setting key without stopping the operation of the machine tool, when the information from the one-sheet takeout sensor indicates a one-sheet takeout failure.

In a preferred aspect of the present invention, in the case where the one-sheet takeout sensor indicates a one-sheet takeout failure, when the restoration setting key indicates measuring range change, the controller changes the required measuring range on the basis of measuring results of the one-sheet takeout sensor.

In a preferred aspect of the present invention, in the case where the one-sheet takeout sensor indicates a one-sheet takeout failure, when the restoration setting key indicates workpiece accumulating place movement, the controller determines whether a pallet capable of carrying the workpiece sucked by the one-sheet takeout equipment is present and sends a command of moving a sucked workpiece to the pallet with the one-sheet takeout equipment.

In a preferred aspect of the present invention, in the case where the one-sheet takeout sensor indicates a one-sheet takeout failure, when the restoration setting key indicates workpiece takeout schedule change, the controller adds each plate thickness of a plurality of takeout schedules, and when the added result becomes coincident with the workpiece plate thickness detected by the one-sheet takeout sensor, the controller skips the takeout schedule up to the added plate thickness and, at the next time, draws a next takeout schedule.

In a preferred embodiment of the present invention, the controller comprises a one-sheet takeout command means for drawing the takeout schedule of the workpiece and, on the basis of plate thickness of the takeout schedule, determines a measuring range of the one-sheet takeout sensor, sending the measuring range to the one-sheet takeout sensor and, at the same time, sending continuously a one-sheet takeout signal to the one-sheet takeout equipment until the number of sheets of the takeout schedule is reached. The controller may also include measuring range changing means for increasing or decreasing the measuring range determined by the one-sheet takeout command means by a required range, and error workpiece moving command means for determining whether a pallet capable of carrying the workpiece sucked by the one-sheet takeout equipment is present on the accumulating equipment, and sending a command of moving a sucked workpiece to a pallet. Takeout schedule changing means may also be provided for adding the plate thickness of a plurality of takeout schedules, and when the added result becomes coincident with the workpiece plate thickness detected by the one-sheet takeout sensor, the takeout schedule may be skipped up to added plate thickness and, at the next time, a next takeout schedule may be drawn. Further, one-sheet takeout error continuing command means may be provided for reading the state of the restoration setting key when the one-sheet takeout sensors indicates a one-sheet takeout failure, and for activating the measuring range changing means when the state indicates a measuring range automatic update mode, activating the error workpiece moving command means when the state indicates an accumulating place moving mode, and activating the takeout schedule changing means when the state indicates a takeout schedule change.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a view showing a workpiece takeout schedule in the present invention;

DESCRIPTION OF THE PREFERRED EMBODIMENTS

With reference to the drawings, embodiments of the present invention will be explained in detail hereinafter.

Figure 1:
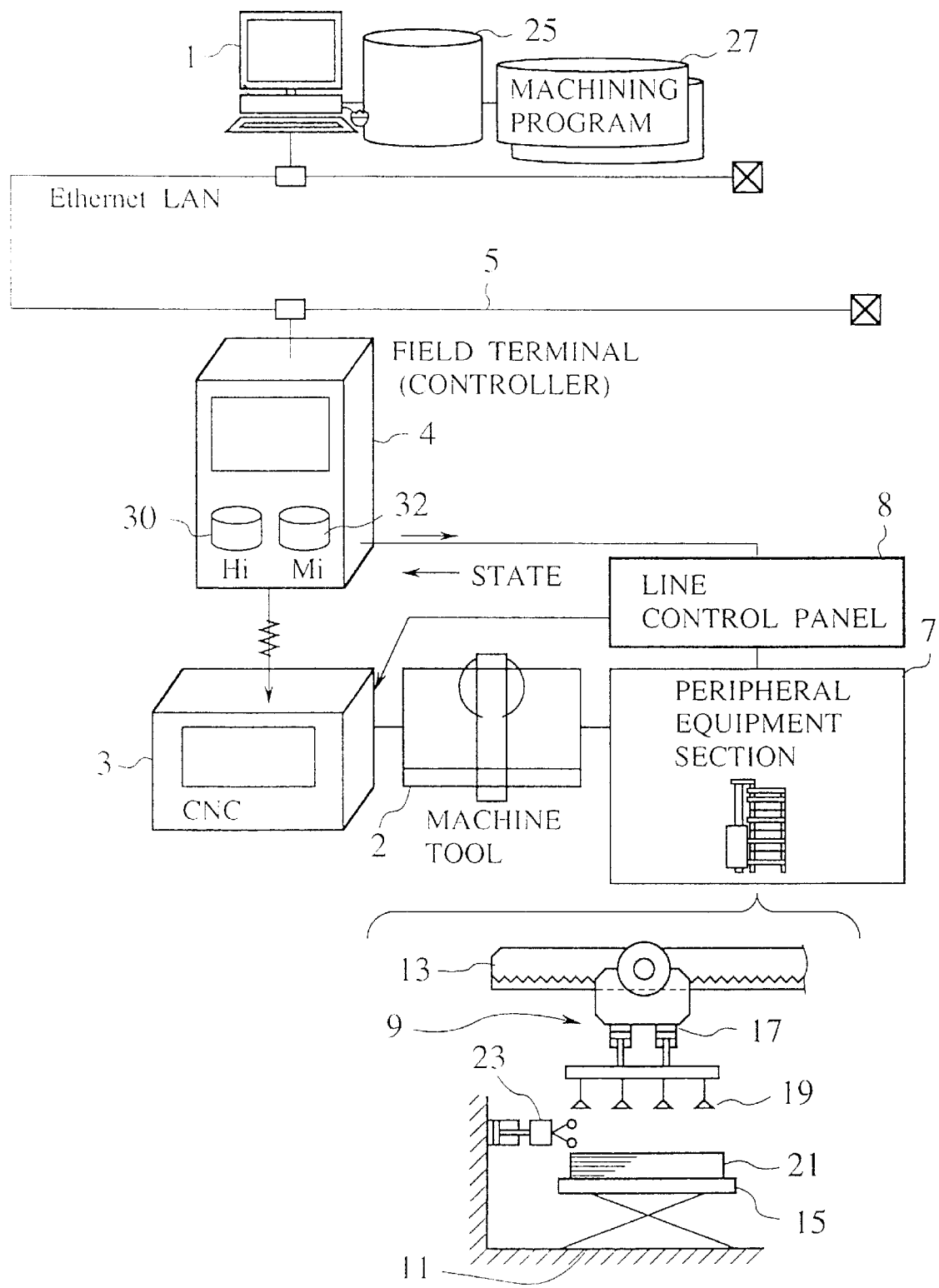
FIG. 1 is a schematic composition view of a conventional machine tool control system.
Figures 2, 3:
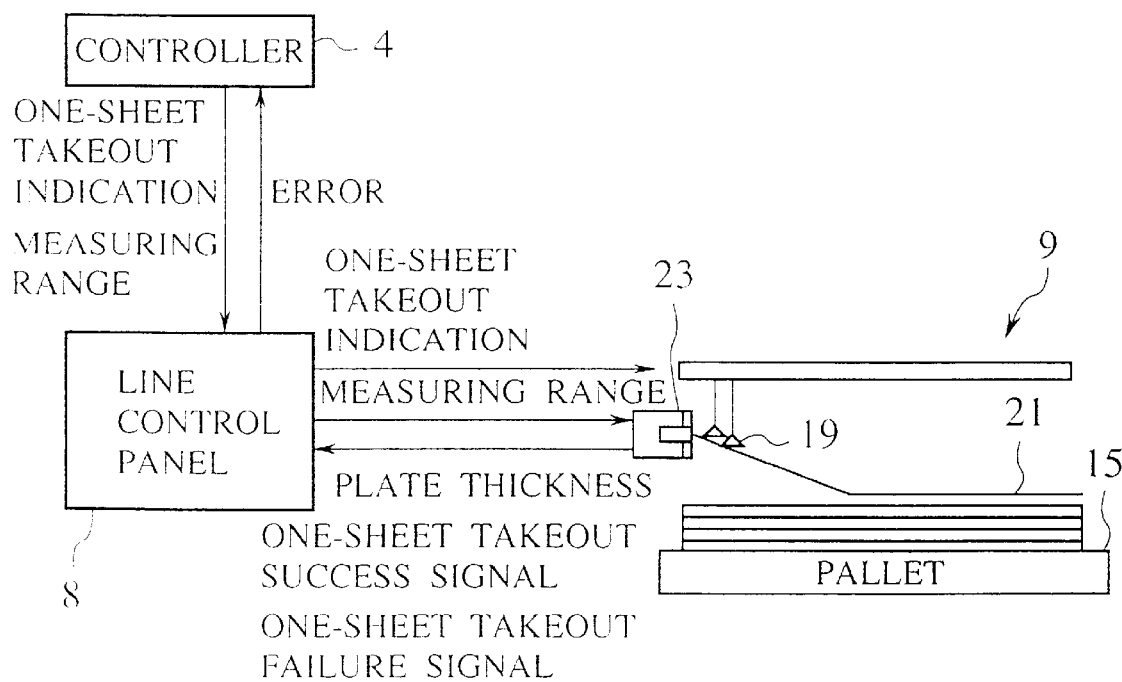
FIG. 2 is an illustrative view to help explain a workpiece takeout schedule in prior art.
FIG. 3 is an illustrative view to help explain the operation of a conventional one-sheet takeout equipment and one-sheet takeout sensor.
Figure 4:
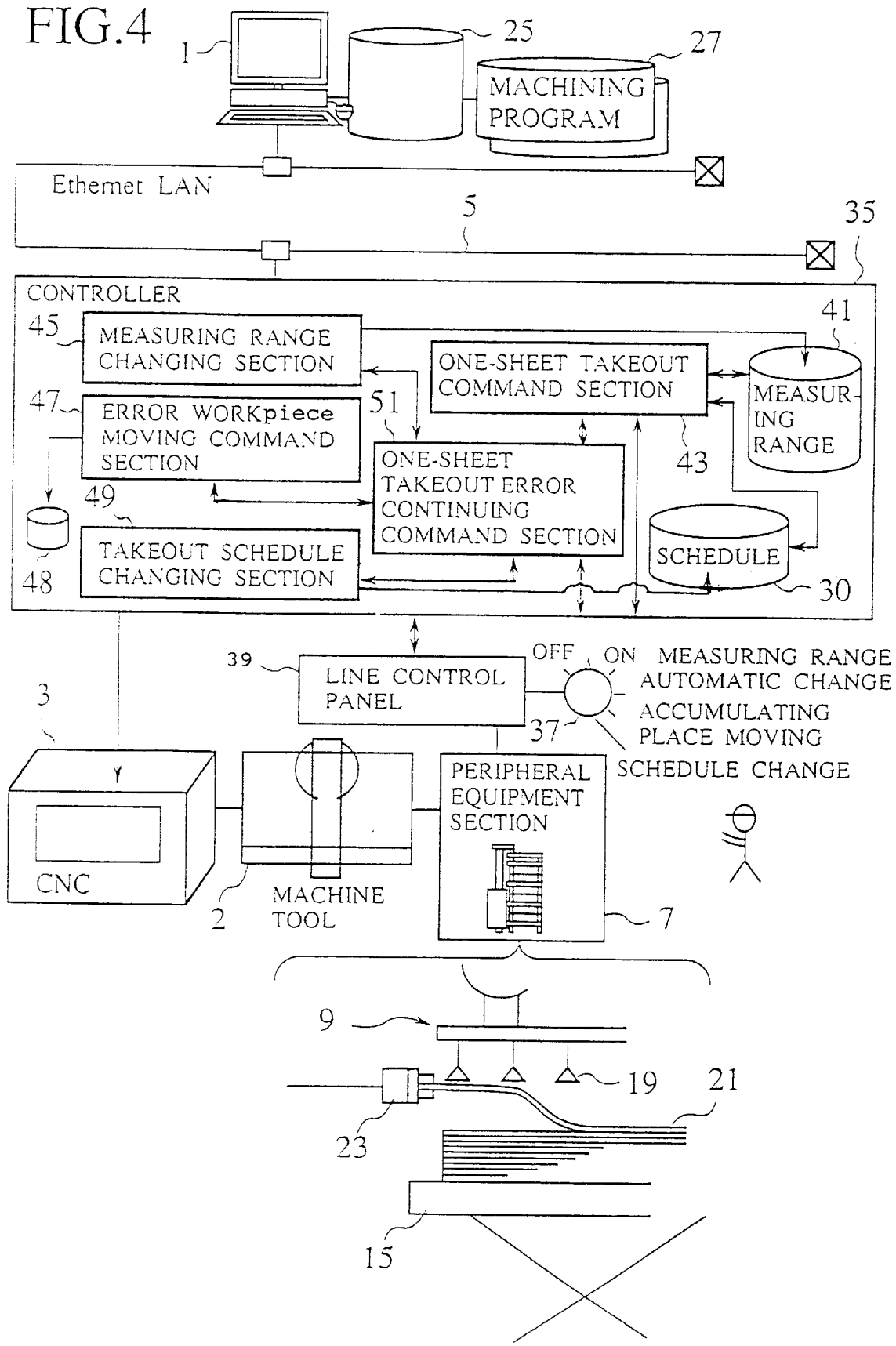
FIG. 4 is a schematic composition view of one embodiment in a machine tool control system of the present invention.

FIG. 4 is a schematic composition view of one embodiment of a machine tool control system of the present invention. The machine tool control system shown in FIG. 4 includes both a controller 35 which, when a one-sheet takeout equipment fails to take out one piece, executes processing based on an automatic reset mode predetermined by a worker so as to continue line operation, and a line control panel 39 which is provided with a restoration setting key 37 for setting an operation mode when the equipment fails to take out one piece, and which notifies the controller 35 of the setting state of the restoration setting key 37, and of each current state while controlling each equipment of a peripheral equipment section 7.

The controller 35, as shown in FIG. 4, includes a schedule file 30, a measuring range file 41, a one-sheet takeout command section 43, a measuring range changing section 45, an error workpiece moving command section 47, a pallet information file 48, a one-sheet takeout schedule changing section 49, and a one-sheet takeout continuing command section 51.

The one-sheet takeout command section 43, in the initial state, reads a workpiece takeout schedule of the schedule file 30, and with a set plate thickness taken as a reference value, determines an initial measuring range of a one-sheet takeout sensor 23 from the reference value, and outputs it through the line control panel 39 to the one-sheet takeout sensor 23, and thereafter, outputs a measuring range corresponding to the takeout schedule stored in the measuring range file 41. In accordance with the present invention, the initial measuring range may be set to a range equal to the set plate thickness plus and/or minus a predetermined tolerance or error amount. The tolerance or error amount may be set based on various factors including, for example, the accuracy or precision of the one-sheet takeout sensor 23.

The measuring range changing section 45 is activated when a one-sheet takeout result information of a monitor information indicates a one-sheet takeout failure, and reads the initial measuring range determined by the one-sheet takeout command section 43 to increase or decrease the initial measuring range by one range. The amount or range by which the measuring range is to be increased or decreased may be determined based on a scale of thicknesses by which the plate material is measured. For example, if the thickness of the plates are defined based on a scale of 0.8, 1.0, 1.2, 1.6, 2.0, 2.3 mm, and if the thickness of the plate materials used by a drawn schedule is 1.0 mm, then increasing the measuring range by one range would result in the initial measuring range being increased to 1.2 mm (plus and/or minus the predetermined tolerance or error amount) and decreasing the measuring range by one range would result in the initial measuring range being decreased to 0.8 mm (plus and/or minus the predetermined tolerance or error amount).

When the one-sheet takeout result information of the monitor information indicates a one-sheet takeout success, a changed value is stored in the measuring range file 41 as the measuring range optimum to measure the plate thickness of the workpiece 21. That is, when the same takeout schedule is drawn thereafter, the pallet thickness is measured by the optimum measuring range.

The error workpiece moving command section 47, when activated, reads the workpiece plate thickness which could be measured according to the initial measuring range determined by the one-sheet takeout command section 43, and determines where the pallet capable of accumulating the workpiece 21 having the plate thickness is located by accessing the pallet information from the pallet information file 48. The information stored in the pallet information file 48 may include information regarding the location of the pallet, as well as information regarding what type of equipment (e.g., machining tool, front and rear equipments, pallet, etc.) are present. After the location of the pallet is determined, the section 47 then sends a command of accumulating to the retrieved pallet to the line control panel 39.

The takeout schedule changing section 49, when activated, may update to a schedule in schedule file 30 either the plate thickness of the workpiece 21 which could be measured according to the initial measuring range determined by the one-sheet takeout command section 43, or the number of sheets corresponding to the plate thickness.

The one-sheet takeout continuing command section 51 reads the monitor information from the line control panel 39, and when the one-sheet takeout information of the monitor information indicates a one-sheet takeout failure, reads the setting state of the restoration setting key 37 of the line control panel 39, and when the key indicates a measuring range automatic change, activates the measuring range changing section 45. When the setting state indicates an accumulating place moving, the section 51 activates the error workpiece moving command section 47. Further, when the setting state indicates a take out schedule change, the section 51 activates the takeout schedule changing section 49.

Figure 6:
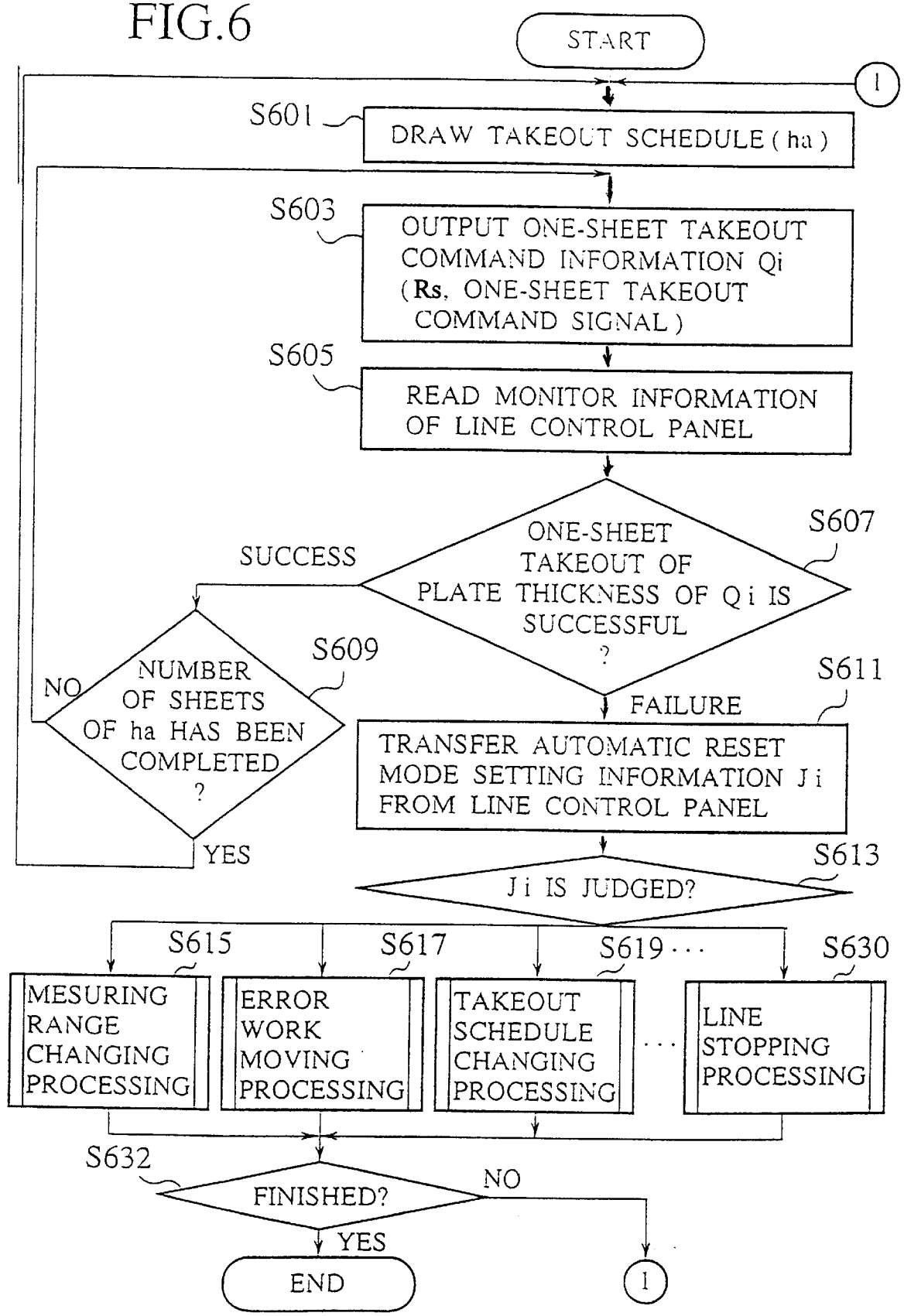
FIG. 6 is a flowchart to help explain the entire operation of the present invention.

With reference to FIGS. 4–6, the operation of the machine tool control system composed as described above will be explained hereinafter. The controller 35 copies the machining schedule and the machining program through the Ethernet 5 from the tool center 1.

The one-sheet takeout command section 43 draws, for example, as shown in FIG. 5, a No. 20 takeout schedule ha from machining schedule (Step S601 in FIG. 6).

Then, with the set plate thickness of the takeout schedule ha taken as a reference value, the initial measuring range is to be determined, and the initial measuring range and the one-sheet takeout command signal Rs (hereinafter generically called the one-sheet takeout command information Qi) are to be continuously outputted to the line control panel 39 until the number of sheets, one of the data of the drawn takeout schedule, is reached (Step S603).

The line control panel 39 reads the one-sheet takeout command information Qi, and sends the initial measuring range to the one-sheet takeout sensor 23 and, at the same time, sends the one-sheet takeout command signal to the one-sheet takeout conveying equipment 9.

The one-sheet takeout continuing command section 51 of the controller 35 reads the monitor information of the line control panel 39 (Step S605) to judge whether the one-sheet takeout relating to the one-sheet takeout command information is successful (Step S607). The monitor information includes a one-sheet takeout failure information or a one-sheet takeout success information.

Where a one-sheet takeout operation is performed with the initial measuring range or the measuring range set to the one-sheet takeout sensor 23 and when, for example, two sheets or more of workpieces intended are sucked, or workpieces of different kinds and thicker thickness sucked, information, e.g., "measuring range is small" is sent back as the one-sheet takeout failure information.

When workpieces of different kinds from and thinner thickness than those intended are sucked, information, e.g., "measuring range is large" is sent back as the one-sheet takeout failure information.

The one-sheet takeout success information, which is information showing one-sheet takeout success, particularly indicates that the one-sheet takeout was successful in which case either where it was performed according to the measuring range initially determined by the one-sheet takeout command section, or where it was performed according to the measuring range resent.

The one-sheet takeout failure information and the one-sheet takeout success information are generically called the one-sheet takeout result information.

The one-sheet takeout continuing command section 51, when determining that one-sheet takeout is successful at Step S607, judges whether the sucking and conveying of the workpiece 21 for the number of sheets of the takeout schedule ha has been completed (Step S609).

The section 51, when judging that the conveying of the workpiece 21 for the number of sheets has not been completed at Step S609, returns the process to Step S603, and sends again the one-sheet takeout command information Qi to the line control panel 39.

The section 51, when judging that the sucking and conveying of the workpiece 21 for the number of sheets of the takeout schedule ha has been completed at Step S609, returns the process to Step S601, and draws the next schedule ha.

The one-sheet takeout continuing command section 51, when judging that one-sheet takeout fails at Step S607, directs the line control panel 39 to send an automatic restoration mode setting information Ji of the restoration setting key 37 provided on the line control panel 39 (Step S611).

Why the restoration setting key 37 may be provided on the line control panel 39 side is because the line control panel 39 is generally installed on the FMS line side, and if there is some error or specification change, a local worker can immediately set the mode. Of course, where the controller 35 is installed near the worker, the restoration setting key 37 may be provided on the controller 35.

The one-sheet takeout continuing command section 51 judges the automatic restoration mode setting information Ji from the line control panel 39 to determine what one-sheet takeout restoration setting mode is present (Step S613), and on the basis of the results, performs a plate thickness measuring range changing processing (Step S615), an error workpiece moving processing (Step S617), a takeout schedule changing processing (Step S619), or a line stopping processing (Step S630), all of which will be described later.

Then, the section 51, after performing either of the processings, judges whether the processing is finished (Step S632), and when the processing is not finished, returns the process to Step S601.

The line stopping processing at Step S630 is a processing performed when the restoration setting key 37 is set at the OFF side, so that as with prior art, when one-sheet takeout fails, the FMS line is stopped to be returned by the worker.

Figure 7:
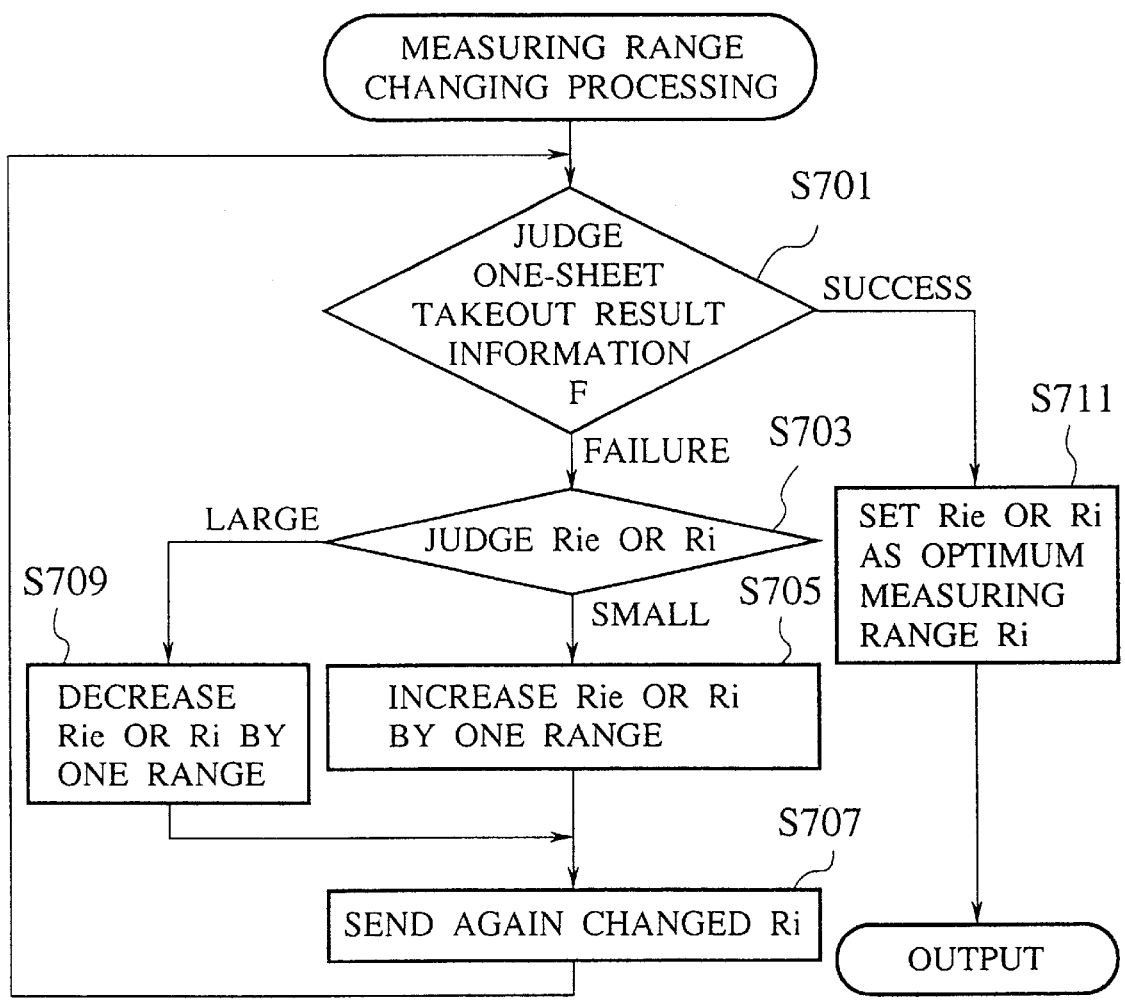
FIG. 7 is a flowchart to help explain a processing of changing a measuring range.

An exemplary embodiment of the measuring range changing processing will be explained using the flowchart of FIG. 7. When the restoration mode setting information Ji indicates the plate thickness measuring range automatic change mode, the one-sheet takeout continuing command section 51 activates the measuring range changing section 45 in place of the one-sheet takeout command section 43.

The measuring range changing section 45, with the activation, reads the monitor information of the line control panel 39, and judges the one-sheet takeout result information F included in the monitor information (Step S701).

When the one-sheet takeout result information F indicates one-sheet takeout failure, the section 45 judges whether the initial measuring range Rie or the measuring range Ri was small or large (Step S703). The determination of whether the measuring range is small or large may be determined based on the detection result of the takeout sensor 23 and the monitor information of the line control panel 39. The section 45, when judging at Step S703 that the initial measuring range Rie or the measuring range Ri was small, increases the initial measuring range Rie or the measuring range Ri by one range (Step S705).

The section 45 sends again the changed measuring range Ri to the line control panel 39, and returns the process to Step 701 (Step S707).

The section 45, when judging at Step 703 that the initial measuring range Rie or the measuring range Ri was large, decreases the initial measuring range Rie or the measuring range Ri by one range (Step S709), transfers the process to Step S707 and sends the measuring range again.

The section 45, when judging at Step S701 that one-sheet takeout is successful, considers the initial measuring range Rie or the measuring range Ri to be an optimum measuring range Ri, and stores the optimum measuring range Ri and the takeout schedule ha as a pair in the measuring range file 41 (Step S711).

An exemplary embodiment of the error workpiece moving processing at Step 617 will be explained using FIG. 8. The error workpiece moving command section 47, when activated, determines where the pallet capable of accumulating the error workpiece 21 is located by accessing the pallet information file 48.

Figure 8A:
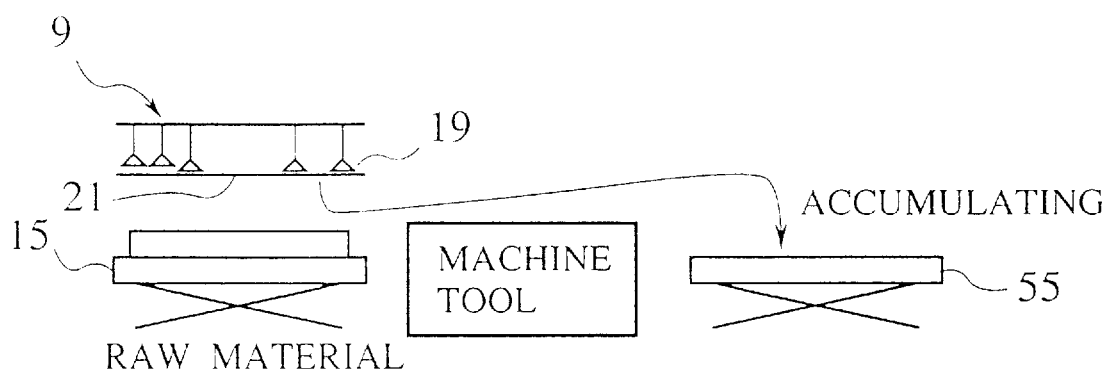
FIGS. 8A and 8B are illustrative views to help explain a processing of moving an error workpiece.

When a pallet 55 capable of accumulating is located, as shown in FIG. 8A, the error workpiece 21 is accumulated on the separate pallet 55 without being discharged to a predetermined machine tool.

Figure 8B:
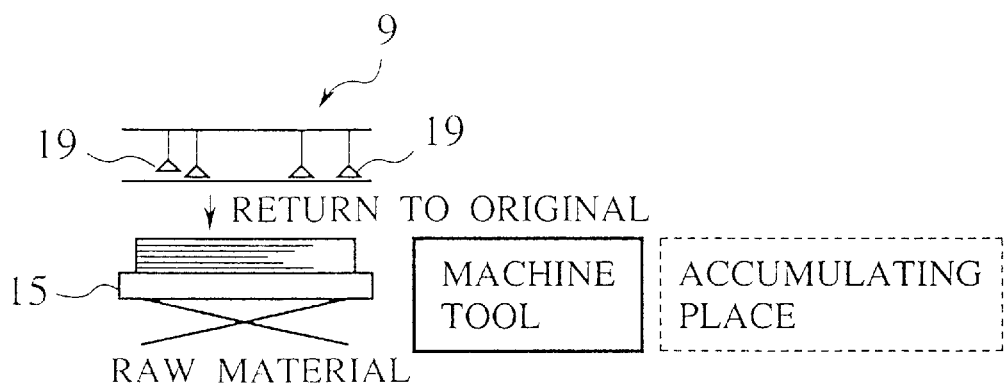

Since a case where the pallet capable of accumulating the error workpiece 21 is absent in the pallet information file 48 shows that a plurality of sheets have been sucked, the vacuum pad 19 of the one-sheet takeout equipment 9 is allowed to move down and return the sheets to the original pallet 15 as shown in FIG. 8B. Then, the vacuum pad 19 is again allowed to move up and suck again one sheet of the workpiece intended.

Figure 9:
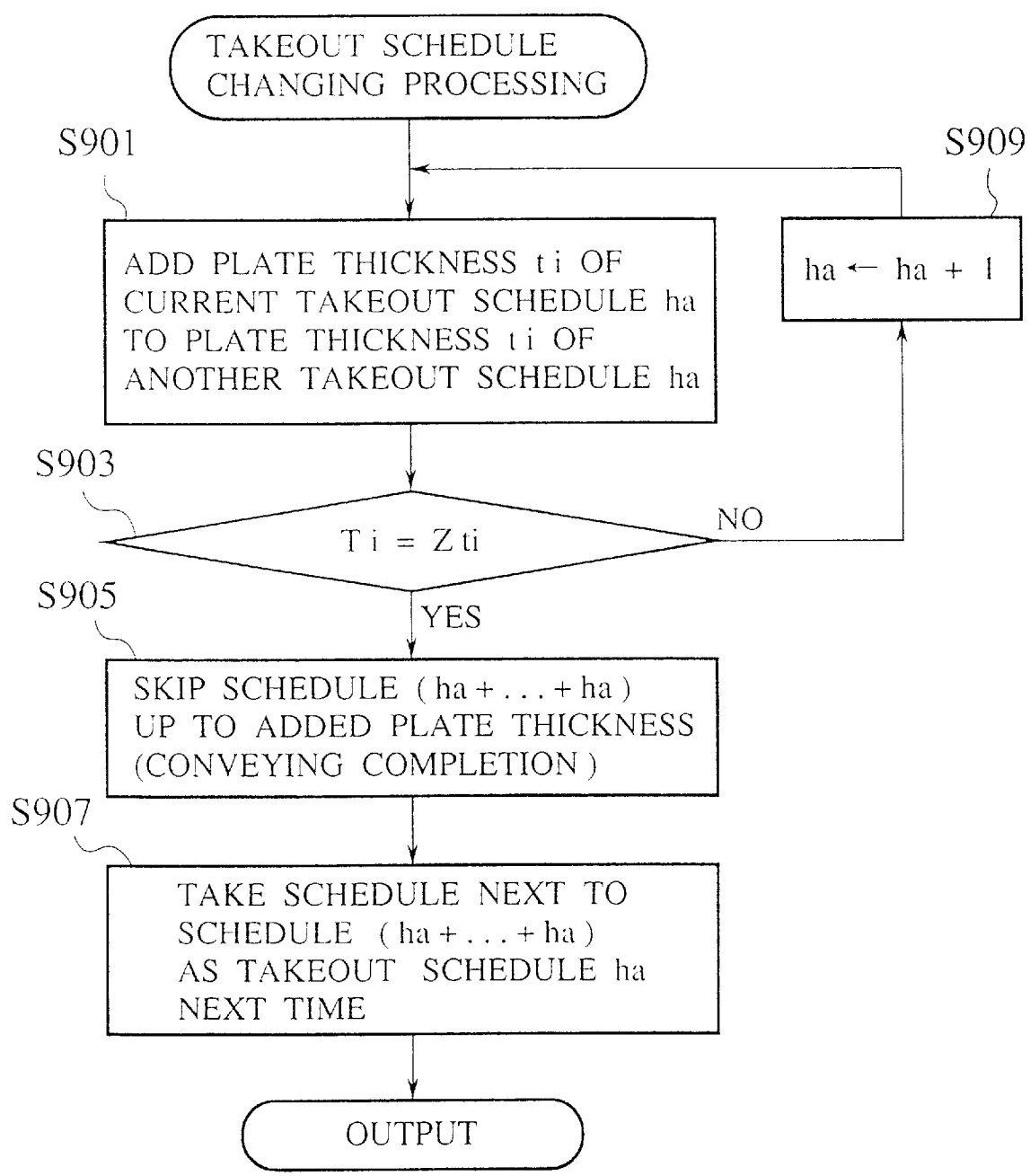
FIG. 9 is a flowchart to help explain a processing of changing a takeout schedule.

An exemplary embodiment of the workpiece takeout schedule changing processing will be explained using the flowchart of FIG. 9.

The takeout schedule changing section 49, when activated, adds the set plate thickness ti of the current takeout schedule ha to the set plate thickness ti of another or next takeout schedule ha (Step S901). Then, the section 49 judges whether the added plate thickness Ti is coincident with an actual plate thickness Zti from the one-sheet takeout sensor 23 (Step S903).

When the actual plate thickness Zti is coincident with the plate thickness Ti at Step S903, the section 49 skips the takeout schedule ha up to the added plate thickness (Step S905). This means that the number of sheets of the takeout schedule ha up to the added plate thickness is conveyed.

Then, with pointing to a takeout schedule ha subsequent to the takeout schedule ha up to the added plate thickness (Step S907), this processing is finished. When the actual plate thickness Zti is not coincident with the plate thickness Ti at Step S903, the process is returned to Step S901 after the current takeout schedule ha is advanced by one (Step S909). If the current takeout schedule has more than one sheet, then at Step S909 processing may be performed by advancing the sheet by one just like advancing the takeout schedule by one before returning to Step S901. That is, while processing the takeout schedule which has more than one sheet, the current sheet may be advanced by one each time Ti does not equal Zti. The number of sheets associated with the current takeout schedule may be counted by the takeout schedule changing section 49. When all of the sheets for the current takeout schedule have been advanced and it is determined that the added plate thickness Ti still does not coincide with the measured thickness Zti, then the takeout schedule may be advanced by one at Step S909 before returning to step S901, and the process repeated until Ti and Zti coincide.

Figure 10:
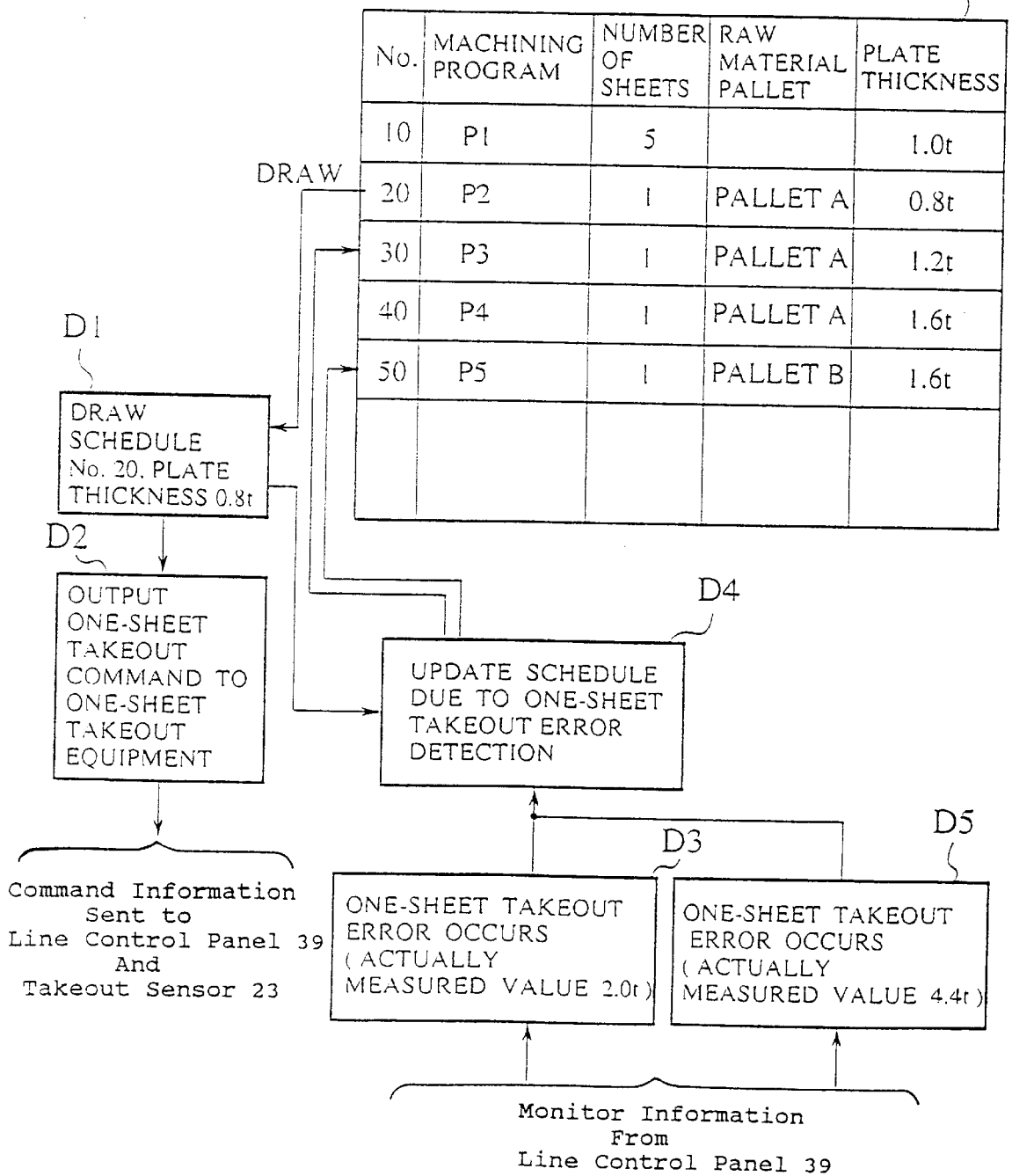
FIG. 10 is an illustrative view to supplement FIG. 9.

The schedule changing processing of FIG. 9 will be explained additionally using FIG. 10. For example, where the section 49 draws the No. 20 takeout schedule ha of the schedule file 30 (D1), and outputs the one-sheet takeout command to the one-sheet takeout conveying equipment (D2), when the one-sheet takeout sensor 23 actually measures the plate thickness to be 2.0 t to cause one-sheet takeout error (D3), the section 49 adds the No. 20 plate thickness to the No. 30 plate thickness.

The added result becomes 0.8 t+1.2 t=2.0 t, wherein "t" is a unit of measure such as, for example, 1 mm. This means that one sheet of a workpiece of 0.8 t and one sheet of a workpiece of 1.2 t are simultaneously sucked. That is, No. 20 and No. 30 are handled, so that the update to No. 30 is to be performed (D4). Where the takeout schedule ha of No. 30 is drawn, when the one-sheet takeout sensor 23 actually measures the plate thickness to be 4.4 t to cause one-sheet takeout error (D5), the section 49 adds the No. 30 through No. 50 plate thickness.

The added result becomes 1.2 t+1.6 t+1.6 y=4.4 t. This means that one sheet of a workpiece of 1.2 t and two sheets of a workpiece of 1.6 t are simultaneously sucked. That is, No. 30 and No. 50 are handled, so that the update to No. 50 is to be performed.

Thus, even if an error workpiece is sucked, or a few sheets of workpiece are sucked, the operation will not be stopped and the schedule can be handled rapidly.

As described above, according to one aspect of the present invention, when the one-sheet takeout equipment sucks the workpiece on the pallet and the one-sheet takeout sensor indicates a one-sheet takeout failure, the system reads a mode set on the restoration setting key without stopping the operation of the machine tool so as to perform processing on the basis of the mode, so that an effect is obtained that the operation of the machine tool is continued without human assistance even if one-sheet takeout fails.

According to another aspect of the present invention, when the one-sheet takeout sensor indicates a one-sheet takeout failure, on the basis of the measuring results, the measuring range of the one-sheet takeout sensor is made changed, and the sensor is allowed to measure again, so that an effect is obtained that even if the one-sheet takeout equipment sucks a workpiece of not intended plate thickness, or a few sheets of workpiece simultaneously, the control operation of the machine tool is not stopped.

According to another aspect of the present invention, when the one-sheet takeout sensor indicates a one-sheet takeout failure, a workpiece sucked by the one-sheet takeout equipment is accumulated on the pallet capable of carrying the workpiece, so that an effect is obtained that even if the one-sheet takeout equipment sucks a workpiece of different kind, the operation is not stopped.

According to another aspect of the present invention, when the one-sheet takeout sensor indicates a one-sheet takeout failure, each plate thickness of a plurality of takeout schedules are added, and when the added result is coincident with the workpiece plate thickness detected by the one-sheet takeout sensor, the system skips the schedule up to the added plate thickness and, at the next time, draws the next takeout schedule.

Thus, an effect is obtained that even if an error workpiece is sucked or a few sheets of workpiece are sucked, the operation is not stopped, and the schedule is handled rapidly.

According to another aspect of the present invention, when the one-sheet takeout sensor indicates a one-sheet takeout failure, on the basis of the mode set by the restoration setting key, the measuring range is changed or the accumulating place for sucked workpiece is changed, or on the basis of the actually detected plate thickness, the workpiece takeout schedule is skipped, so that an effect is obtained that even if the worker is not intervened, the processing can be performed according to either of the modes without stopping the operation.

It should be understood that many modifications and adaptations of the invention will become apparent to those skilled in the art and it is intended to encompass such obvious modifications and changes in the scope of the claims appended hereto.

What is claimed:

1. A machine tool control system in which the plate thickness and number of sheets taken out of workpieces for each product are indicated by a workpiece takeout schedule, and when based on the takeout schedule, a workpiece on a pallet of a peripheral equipment section is sucked by a one-sheet takeout equipment, the plate thickness of the workpiece is measured by a one-sheet takeout sensor according to a required measuring range and control of a machine tool is performed by a controller, said system comprising:

a restoration setting key which can set a plurality of different modes to continue the control operation of said machine tool when information from said one-sheet takeout sensor indicates a one-sheet takeout failure; and a controller which performs processing based on a set mode of said restoration setting key, without stopping the operation of said machine tool, when the information from said one-sheet takeout sensor indicates a one-sheet takeout failure.

2. A machine tool control system as set forth in claim 1, wherein in the case that the information from said one-sheet takeout sensor indicates a one-sheet takeout failure, when said restoration setting key indicates a measuring range change mode, the controller changes said required measuring range on the basis of measuring results of said one-sheet takeout sensor.

3. A machine tool control system as set forth in claim 1, wherein in the case that the information from said one-sheet takeout sensor indicates a one-sheet takeout failure, when said restoration setting key indicates a workpiece accumulating place movement mode, the controller determines whether a pallet capable of carrying the workpiece sucked by said one-sheet takeout equipment is present, and sends a command for moving a sucked workpiece to said pallet to said one-sheet takeout equipment.

4. A machine tool control system as set forth in claim 1, wherein in the case that the information from said one-sheet takeout sensor indicates a one-sheet takeout failure, when said restoration setting key indicates a workpiece takeout schedule change mode, the controller adds each plate thickness of a plurality of takeout schedules, and when an added result becomes coincident with a workpiece plate thickness detected by said one-sheet takeout sensor, the controller skips the takeout schedule up to the added plate thickness and, at the next time, draws a next takeout schedule.

5. A machine tool control system as set forth in claim 1, said controller comprising:

one-sheet takeout command means for drawing the takeout schedule of said workpiece and, on the basis of the plate thickness of the takeout schedule, determining a measuring range of said one-sheet takeout sensor, sending the measuring range to said one-sheet takeout sensor, and, at the same time, sending continuously a one-sheet takeout signal to said one-sheet takeout equipment until the number of sheets of said takeout schedule is reached;

measuring range changing means for increasing or decreasing the measuring range determined by said one-sheet takeout command means;

error workpiece moving command means for determining whether a pallet capable of carrying the workpiece sucked by said one-sheet takeout equipment is present, and sending a command for moving a sucked workpiece to said pallet;

takeout schedule changing means for adding each plate thickness of a plurality of takeout schedules, and when an added result becomes coincident with the workpiece plate thickness detected by said one-sheet takeout sensor, the takeout schedule is skipped up to the added plate thickness and, at the next time, draws a next takeout schedule; and one-sheet takeout error continuing command means for reading a state of said restoration setting key when the information from said one-sheet takeout sensor indicates a one-sheet takeout failure and activating said measuring range changing means when the state of such restoration setting key indicates a measuring range automatic update mode, activating said error workpiece moving command means when the state of said restoration setting key indicates an accumulating place mode, and activating said takeout schedule changing means when the state of said restoration setting key indicates a takeout schedule change mode.

6. A method for controlling a machine tool, said method comprising:

drawing a takeout schedule from a machine schedule, said takeout schedule indicating a plate thickness and number of sheets required for machining a product from workpieces with said machine tools;

determining, based on the plate thickness of said takeout schedule, a measuring range for a one-sheet takeout sensor;

sending a one-sheet takeout signal to a one-sheet takeout equipment to lift a workpiece from a stack of workpieces;

measuring, with said one-sheet takeout sensor, a plate thickness of the workpiece lifted by said one-sheet takeout equipment;

determining whether a one-sheet takeout failure exists based on a plate thickness measured by said one-sheet takeout sensor and the plate thickness of said takeout schedule;

detecting, when a one-sheet takeout failure is detected, a restoration mode set by a restoration setting key; and continuing a control operation of said machine tool based on the detected restoration mode so that processing may continue without stopping the operation of said machine tool.

7. A method for controlling a machine tool according to claim 6, said method further comprising:

changing the measuring range based on the measuring result of said one-sheet takeout sensor when a one-sheet takeout failure is detected and the restoration mode indicates a measuring range change mode.

8. A method for controlling a machine tool according to claim 7, wherein said changing the measuring range comprises:

detecting whether the measuring range is small or large based on the plate thickness measured by said one-sheet takeout sensor;

increasing the measuring range by a first predetermined range when the measuring range is detected as being small; and decreasing the measuring range by a second predetermined range when the measuring range is detected as being large.

9. A method for controlling a machine tool according to claim 6, said method further comprising:

determining, when a one-sheet takeout failure is detected and the restoration mode indicates a workpiece accumulating place moving mode, whether an accumulating pallet capable of carrying the workpiece lifted by said one-sheet takeout equipment is present; and sending a command to said one-sheet takeout equipment for moving the lifted workpiece to said accumulating pallet.

10. A method for controlling a machine tool according to claim 6, said method further comprising:

adding, when a one-sheet takeout failure is detected and the restoration mode indicates a workpiece takeout schedule change mode, each plate thickness of a plurality of takeout schedules until an added result becomes coincident with the plate thickness measured by said one-sheet takeout sensor; and skipping, when an added result becomes coincident with the plate thickness measured by said one-sheet takeout sensor, the takeout schedule up to the added plate thickness and at the next processing time, drawing the next schedule for processing.

11. A method for controlling a machine tool according to claim 6, said method further comprising:

detecting when said restoration setting key is set at an OFF position; and stopping a line processing when a one-sheet takeout failure is detected and said restoration setting key is detected as being in an OFF position.

* * * * *